G. A. WIRT.
FODDER CARRIER.
APPLICATION FILED DEC. 2, 1912.

1,130,786.

Patented Mar. 9, 1915.

Witnesses
Frank A. Sahle
Josephine Gasper

Inventor
George A. Wirt,
By
Arthur M. Hood
Attorney

UNITED STATES PATENT OFFICE.

GEORGE A. WIRT, OF GREENSBURG, INDIANA.

FODDER-CARRIER.

1,130,786.    Specification of Letters Patent.    Patented Mar. 9, 1915.

Application filed December 2, 1912. Serial No. 734,454.

*To all whom it may concern:*

Be it known that I, GEORGE A. WIRT, a citizen of the United States, residing at Greensburg, in the county of Decatur and State of Indiana, have invented a new and useful Fodder-Carrier, of which the following is a specification.

The object of my invention is to produce a detachable rack for use upon farm sleds or wagons by means of which an enlarged carrying capacity may be produced for carrying corn fodder, etc., the construction being such that the sides of the vehicle are left unobstructed so that the stalks may be readily placed from the side of the vehicle.

The accompanying drawings illustrate my invention.

Figure 1:
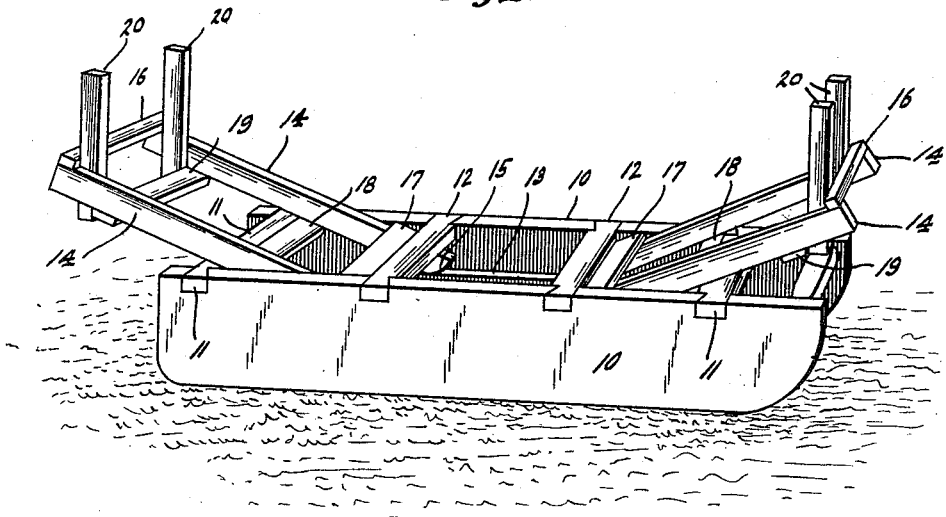
Figure 2:
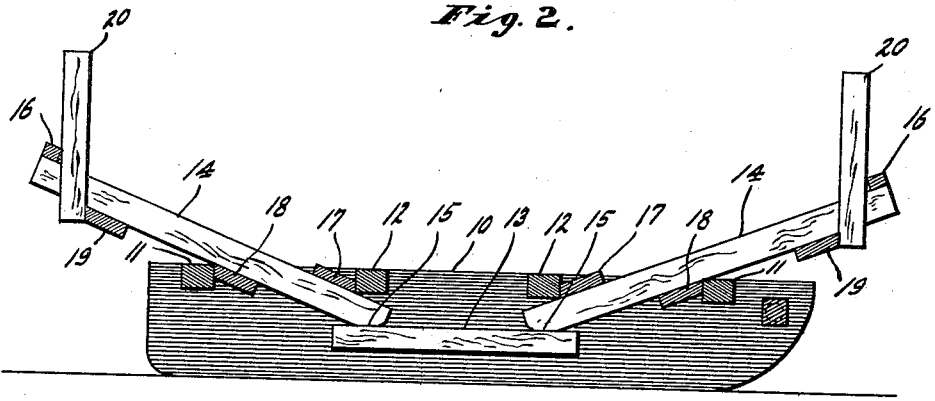

Figure 1 is a perspective view of a sled equipped with my improved racks and Fig. 2 a longitudinal section.

In the drawings, 10, 10 indicate the side bars of the vehicle, said side bars, in the structure shown in the drawings, forming the runners of a sled. The bars 10, 10 are connected front and rear by cross bars 11, 11, and at intermediate points are connected by cross bars 12, 12. Secured to the inner face of each bar 10 is a longitudinal ledge 13, the purpose of which will appear.

My improved rack consists of two identical frames each of which comprises two side bars 14, 14 having their lower corners at one end preferably beveled as indicated at 15, 15. The two bars 14, 14 are connected across their upper edges by cross bars 16 and 17 and are connected across their lower edges by cross bars 18 and 19. Secured to the vertical face of each member 14 near its outer or upper end, is a post 20 which is secured in such relationship that when the rack is in position upon the vehicle the posts will stand substantially vertical.

In placing the improved frame in position upon the vehicle, the beveled ends 15 of the bars 14 are projected downwardly and inwardly between a pair of cross bars 11 and 12 of the vehicle so that cross bar 17 of the frame engages cross bar 12 of the vehicle and cross bar 18 drops in alongside of cross bar 11 so that the frame is held against longitudinal displacement. This inserting movement of the frame brings the beveled ends 15 of the side bars down upon the ledge 13, thus preventing downward movement of the inner end of the frame and downward movement of the outer end of the frame is prevented by the bars 14 resting upon bar 11. Upward movement of the inner end of the frame is prevented by the inner ends of the bars 14 lying under bar 12.

By this construction it will be seen that the sides of the vehicle are left entirely free and open while the posts 20 form ample support for a considerable quantity of corn stalks or other similar material.

I claim as my invention:

A farm sled fodder carrier comprising the combination of a pair of main side bars 10 which are also sled runners, a substantially horizontal ledge 13 carried by each side bar on its face toward the other side bar, two cross bars 12 connecting the two side bars and located substantially over the ends of the ledges, two other cross bars 11 located near the ends of the side bars and connecting them; and a pair of detachable end frames each comprising a pair of oblique members 14, a pair of upright members 20, cross bars 17 and 18 connecting said side bars and located on their upper and lower sides respectively, and the cross bars 16 and 19 which brace the oblique members 14 and the upright members 20 together, each of said detachable frames when in place having its side bars 14 extending between the side bars 10 and over the cross bars 11 and under the cross bars 12 and resting on the ledges 13, and its cross bars 17 and 18 bearing against the sides of the cross bars 12 and 11 respectively.

In witness whereof, I have hereunto set my hand and seal at Indianapolis, Indiana, this 27th day of November, A. D. one thousand nine hundred and twelve.

GEORGE A. WIRT. [L. S.]

Witnesses:
ARTHUR M. HOOD,
FRANK A. FAHLE.